United States Patent [19]

Domeniconi et al.

[11] 4,150,198

[45] Apr. 17, 1979

[54] HIGH DISCHARGE RATE RESERVE CELL AND ELECTROLYTE

[75] Inventors: Michael J. Domeniconi, Needham, Mass.; Francis G. Murphy, Tiverton, R.I.

[73] Assignee: GTE Laboratories Incorporated, Waltham, Mass.

[21] Appl. No.: 918,253

[22] Filed: Jun. 23, 1978

[51] Int. Cl.$^2$ ............................................. H01M 6/36
[52] U.S. Cl. ..................................... 429/116; 429/196
[58] Field of Search ........................ 429/116, 117, 196

[56] References Cited

U.S. PATENT DOCUMENTS

| | | | |
|---|---|---|---|
| 3,674,566 | 7/1972 | Powers | 429/116 |
| 3,846,177 | 11/1974 | Mauch et al. | 429/116 X |
| 4,012,564 | 3/1977 | Auborn | 429/196 X |
| 4,087,594 | 5/1978 | Marincic | 429/116 X |

*Primary Examiner*—Charles F. LeFevour
*Attorney, Agent, or Firm*—Jerry F. Janssen; David M. Keay

[57] ABSTRACT

Electrochemical cells operable in a reserve-activated mode and capable of high discharge rates and capacity comprise an active anode material, a solid non-consumable inert cathode current collector, and an electrolytic solution comprising an electrochemically reducible inorganic oxyhalide or thiohalide solvent and a Lewis acid dissolved therein, the Lewis acid being the sole additive solute in the electrolytic solution.

7 Claims, 3 Drawing Figures

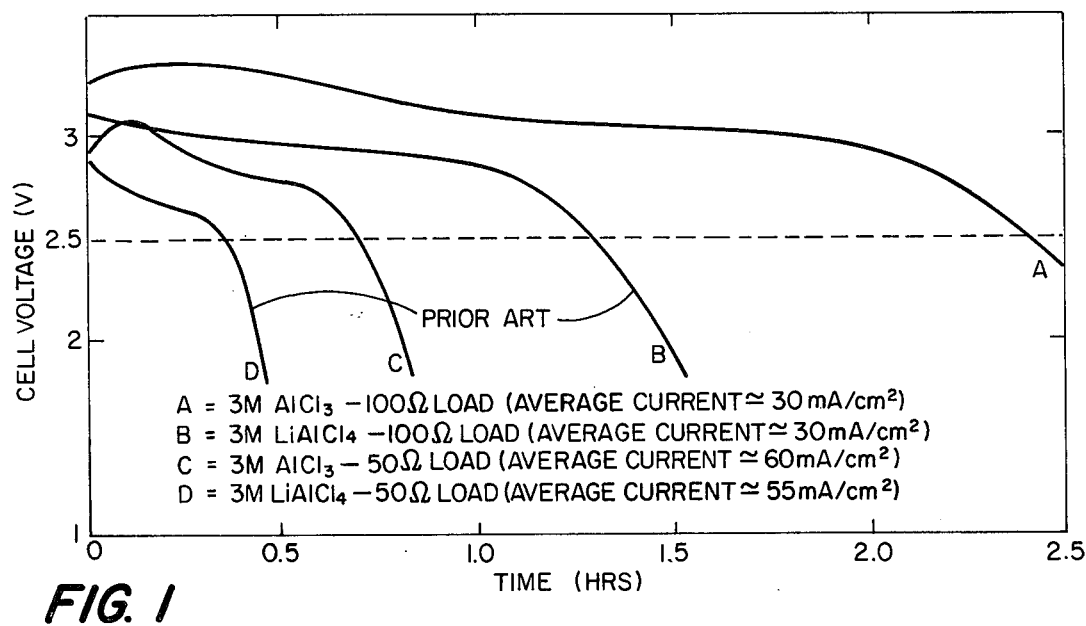
FIG. 1
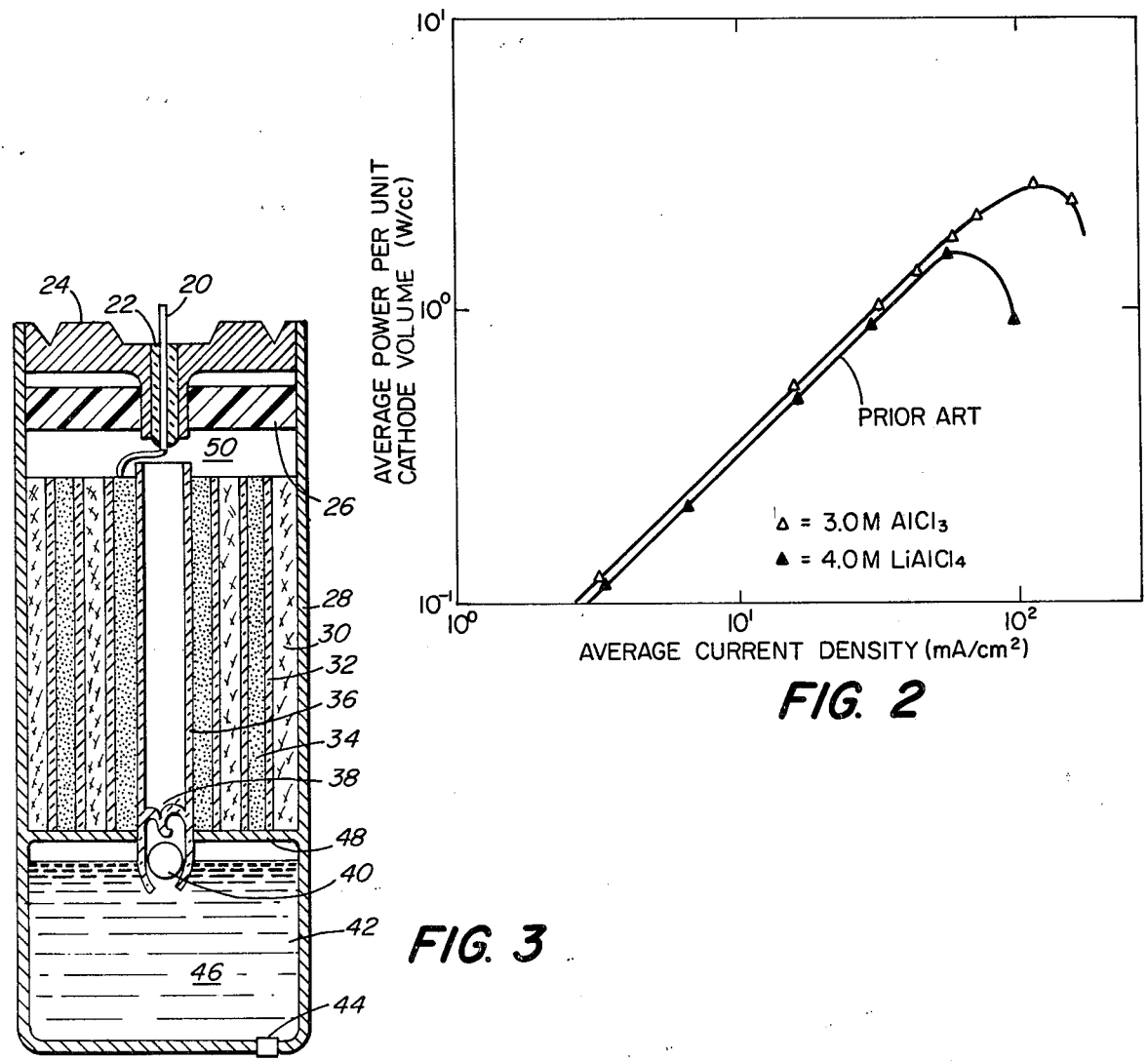
FIG. 2
FIG. 3

HIGH DISCHARGE RATE RESERVE CELL AND ELECTROLYTE

BACKGROUND OF THE INVENTION

This invention relates to electrochemical cells. More particularly, it relates to high discharge rate electrochemical cells operable in a reserve-activated mode.

Electrochemical cells employing active alkali metal anodes and electrolyte systems based on oxyhalides or thiohalides of the Group VA and Group VIA elements of the Periodic Table of Elements are well known in the art. Such cells generally make use of an alkali metal salt solute in the electrolyte solution to increase the electrical conductivity of the solution and decrease the internal resistance of the cell.

U.S. Pat. No. 4,012,564 issued to James Auborn and assigned to the assignee of the instant application discloses a number of electrolyte solute salts for use in cells comprising an alkali metal anode and a covalent oxyhalide or thiohalide electrolyte solvent. As taught therein, Lewis acid solutes are used in conjunction with a metal halide such as lithium chloride, that is, in conjunction with a Lewis base. When such electrolyte solutes comprise Lewis acids alone or in excess, a problem which arises is the corrosive attack of alkali metal anodes by the Lewis acid. French Pat. No. 1,583,804 discloses a lithium anode cell employing an electrolyte system comprising lithium tetrachloroaluminate dissolved in an oxyhalide solvent. As taught therein, the lithium tetrachloroaluminate is formed by reaction of the Lewis acid, aluminum chloride, with the Lewis base, lithium chloride, in the oxyhalide solvent system. The Lewis base is deliberately employed therein in excess to forestall the possibility of corrosive attack of the alkali metal anode by aluminum chloride.

It has thus generally been held in the prior art that in the construction of primary electrochemical cells employing an active alkali metal anode and an electrolyte comprising an electrochemically reducible inorganic oxyhalide or thiohalide electrolyte solvent and a solute contained therein, that (1) the solute be a highly dissociated salt in the given electrolyte solvent in order to provide sufficient electrical conductivity for operation of the cell, and (2) that the solute be of a material other than a Lewis acid, to prevent corrosion of the active anode material. During discharge of cells based on an alkali metal anode, and an oxyhalide or thiohalide electrolyte solvent with a dissolved neutral salt solute, oxidation of the active alkali metal anode results in the production of alkali metal cations in the electrolyte solution. Simultaneous electrochemical reduction of the oxyhalide or thiohalide electrolyte solvent at the cathode produces, among other reaction products, halide ions. The halide ions react rapidly with alkali metal ions already present in high concentration in solution. The resulting alkali metal halide precipitates from solution and alkali metal ions produced by oxidation of the anode material replace the ions removed from solution. This process begins immediately upon discharge of the cell. In cells employing high surface area porous catalytic cathodes, precipitation of insoluble products of the cell discharge reactions clogs the pores of the cathode, reducing the rates of migration of materials to and from the active catalytic cathode surface, eventually causing the cell to cease functioning by passivating the catalytic surface. The overall result is a cell whose discharge rate and capacity are limited. One means employed to overcome this limitation has been the incorporation into the cell of large amounts of porous catalytic cathode material, which unfortunately in turn limits the volume of reducible electrolyte material which can be contained in a given cell volume.

SUMMARY OF THE INVENTION

Electrochemical cells having longer discharge life and higher discharge rate capability are provided by cells according to the present invention which comprise an oxidizable active anode, a solid-non-consumable electrically conducting, inert cathode current collector, and an electrolytic solution consisting essentially of a liquid, electrochemically reducible covalent inorganic oxyhalide or thiohalide solvent, and a Lewis acid solute dissolved therein, the Lewis acid being the sole additive solute in the solvent.

In one embodiment, cells according to the present invention are operated in a reserve-activated mode wherein the electrolytic solution is contained in a first chamber and the anode and cathode are contained in a second chamber with valve means disposed between the first and second chambers, the valve means having a first closed condition for maintaining the contents of the two chambers separate, and a second open condition to permit the contents of the first chamber to enter the second chamber.

BRIEF DESCRIPTION OF THE DRAWINGS

FIG. 1 shows discharge curves for cells according to the present invention compared to discharge curves for cells according to the prior art.

FIG. 2 shows, on logarithmic scales, the power density of cells according to the present invention at various current densities compared to corresponding curves for cells according to the prior art.

FIG. 3 shows, in cross section, a cell according to one embodiment of the invention.

For a better understanding of the present invention, together with other and further objects, advantages and capabilities thereof, reference is made to the following disclosure and appended claims in connection with the above-described drawings.

DETAILED DESCRIPTION OF THE INVENTION

Electrochemical cells according to the present invention comprise an oxidizable active anode, a solid non-consumable electrically conductive cathode current collector and an electrolytic solution.

The electrolytic solution of cells according to the present invention comprises essentially a stable liquid covalent inorganic oxyhalide or thiohalide solvent and a Lewis acid solute dissolved therein. Applicable solvent materials include phosphorus oxychloride, monofluorophosphoryl dichloride, monobromophosphoryl dichloride, phosphorus oxybromide, thionyl chloride, thionyl bromide, sulfuryl chloride, selenium oxychloride, and compatible mixtures thereof. The preferred solvent for cells according to the present invention is thionyl chloride. The solvent must be dried prior to use, which can be accomplished by using the method of U.S. Pat. No. 3,998,660 issued to Sheldon I. Lieberman and assigned to the assignee of the instant application. Drying and purification of thionyl chloride by this method results in materials having a specific conductance of less than $4 \times 10^{-9}$ ohms$^{-1}$ cm$^{-1}$. Other solvents can be dried and purified by similar techniques known to the art.

The slight electrical conductivity of pure thionyl chloride is ascribed to autoionization of the solvent according to the equilibria:

$$SOCl_2 \rightleftharpoons SOCl^{30} + Cl^- \rightleftharpoons SO^{++} + 2Cl^-$$

Similar self-ionization processes occur with the other oxyhalide and thiohalide solvents included within the scope of this invention. The degree of self-ionization of the solvent can be enhanced to a small extent by the inclusion of a Lewis acid solute in the electrolyte solvent. The term "Lewis acid," as used throughout this specification and claims, follows the widely accepted definition of any compound capable of entering into a chemical reaction by accepting an electron pair to form a covalent chemical bond.

Typical solutes for electrolyte solutions for cells according to this invention include boron trichloride ($BCl_3$), aluminum chloride ($AlCl_3$), titanium chloride ($TiCl_4$), zirconium chloride ($ZrCl_4$), tin chloride ($SnCl_4$), phosphorus chloride ($PCl_5$), arsenic chloride ($AsCl_5$), antimony chloride ($SbCl_5$), zinc chloride ($ZnCl_2$), aluminum bromide ($AlBr_3$), and arsenic fluoride ($AsF_5$). In the case of the preferred solvent for this invention, thionyl chloride, autoionization of the solvent is enhanced by formation of an anion between chloride ion, derived from the solvent, and the Lewis acid solute according to the general reaction:

$$SOCl_2 + MCl_x \rightleftharpoons SOCl^+ + MCl_{(x+1)}^-$$

where M is a metal capable of accommodating an additional electron pair in the compound $MCl_x$. The extent to which the above equilibrium reaction is shifted to the right varies with the nature of the Lewis acid, but is generally only slight.

For this reason, it has been held in the prior art that in order to produce sufficient electrical conductivity in electrochemical cells employing oxyhalide or thiohalide electrolyte solvents, the solute must be a salt of a Lewis acid which is highly dissociated. Electrolyte solutions comprised of a Lewis acid as the sole solute in an oxyhalide or thiohalide have been dismissed in the prior art from consideration as effective electrolytes because of their low measured ionic conductivity. Cells employing an oxyhalide or thiohalide solvent and a Lewis acid solute as the sole added solute for an electrolyte system have not heretofore been considered feasible power sources.

It has been found, however, that electrochemical cells according to the present invention, constructed of an active, oxidizable anode material, an inert cathode current collector, and an electrolyte solution comprising an electrochemically reducible covalent inorganic oxyhalide or thiohalide solvent containing a Lewis acid solute as the sole added solute have high electrical discharge rates and longer discharge lives.

The active anode material for cells according to this invention includes the alkali or alkaline earth metals, preferably lithium. The inert cathode current collector comprises any material which is electrically conductive and is unreactive in the normal chemical sense toward the constituents of the electrolyte solution, but which provides a surface upon which the covalent inorganic oxyhalide or thiohalide solvent is catalytically reduced during discharge of the cell. Particularly useful cathode current collectors are formed from carbon which contains a sinterable binder such as polytetrafluoroethylene, polyethylene, or polypropylene, pressed into a metallic grid or onto the surface of a thin metallic foil for mechanic support. Metals useful for the grid or foil include materials not corroded by the electrolyte such as nickel, titanium and the like. In a preferred embodiment, the porous carbon cathode material is impressed onto one side of a sheet of about 2 mil thick nickel foil which then serves the dual role of cathode support and current collector.

In cells according to the present invention, the entire cathode system comprises the elements of the reducible electrolyte material, the material providing the surface upon which the electrolyte material is catalytically reduced, and the electrically conducting material which serves to carry the current produced by that electrochemical reduction to a point external to the cell compartment. The material comprising the catalytic surface and the electrical current conductor may be one and the same as in the case of expanded porous metals such as nickel and the like. Alternatively, the material providing the catalytic surface and that serving as the current conductor may be different materials as in the case of a carbonaceous material formed into or around a metallic screen, rod, or strip.

The cathode current collector includes the material providing the catalytic surface upon which the electrolyte material is electrochemically reduced, together with the current conducting material.

A novel and distinct feature of electrochemical cells of the present invention is their effective functioning at high discharge rates and for extended discharge periods even when such cells incorporate very small amounts of catalytic cathode material. The ability of the electrolyte solution in cells according to the present invention to dissolve discharge reaction products from the surface of the catalytic cathode material prevents passivation of that surface. Halide ion, $X^-$, produced by reduction of the oxyhalide or thiohalide solvent at the cathode is converted, by reaction with the Lewis acid solute, into an anion which remains in solution in the electrolyte. This depassivation of the catalytic cathode material surface can be represented in general by the equation:

$$X^- + MX_n \rightleftharpoons MX_{(n+1)}^-$$

The halide ion thus cannot associate with alkali metal cations, produced by oxidation of the anode, to produce an alkali metal halide salt which would otherwise precipitate from solution and interfere with operation of the cell.

Prior to discharge of the cell, the only solute which is added to the electrolyte solvent is a Lewis acid. As the cell discharges, the concentration of Lewis acid drops as it reacts with alkali metal halide, produced by the discharge reduction-oxidation reactions, to produce a highly dissociated alkali metal salt. As this process occurs, the electrical conductivity of the electrolyte solution increases. As long as there is free Lewis acid present in the electrolyte solution, both the anode and cathode surface will be kept free of deposits of passivating cell reaction products.

Since the catalytic cathode material serves primarily to provide a surface upon which the electrolyte solvent is reduced, only a small amount of such material is needed in cells according to this invention, because that surface is kept in a continuous state of non-passivated activity. The life of the cell is thus limited by the amounts of oxidizable anode material, reducible electrolyte solvent material, and Lewis acid solute present in the cell and is not limited by passivation of the electrode surfaces. In cells according to the present invention, it is possible to minimize the volume of catalytic cathode material required and utilize the extra space thus provided to increase the volume of anode material or electrolyte solution contained within a given cell container volume. Cells can be constructed to be limited in their lifetimes by either the amount of anode material or the amount of electrolyte, rather than by the amount of catalytic cathode material incorporated into the cell.

Passivation of the electrodes in cells of the present invention occurs only when all of the Lewis acid solute initially added to the electrolyte solvent has been neutralized by conversion to a salt, neutral in the Lewis sense, by reaction with alkali metal halide produced by cell discharge. At that point, additional alkali metal halide produced by discharge cannot be solubilized by the electrolyte solute, and begins to passivate the electrodes by depositing on the electrode surfaces.

In cells according to the present invention, the Lewis acid solute is added to the electrolyte solute in concentrations up to about 7 moles/liter, preferably about 3 moles/liter.

FIG. 1 shows discharge curves for cells according to the present invention wherein the electrolyte contains a Lewis acid as the sole solute added, compared to cells in which the electrolyte solute is a salt, neutral in the Lewis acid-base sense. The cells comprise in each case of FIG. 1, a lithium anode, a cathode current collector made by pressing carbon containing a polytetrafluoroethylene binder onto the surface of a sheet of 2 mil nickel foil to form a 0.950 mm thick carbon electrode sheet, and an electrolyte solution. The electrolyte in the cases of curves A and C was a 3 molar solution of the Lewis acid aluminum chloride dissolved in dry thionyl chloride. In the cases of curves B and D, the electrolyte was a 3 molar solution of the salt lithium tetrachloroaluminate dissolved in dry thionyl chloride. The cells were constructed to be identical in every respect with the exception of the nature of the electrolyte solute. For comparison of the discharge curves in FIG. 1, a dotted line has been drawn at 2.5 volts. Cell A, employing aluminum chloride as the electrolyte solute, according the the preferred embodiment of the present invention, operated for about 2.4 hours at voltages higher than this cut-off voltage when discharged through a 100 ohm load. This performance represents an 85% increase in cell capacity over cell B discharged under the same conditions to a 2.5 volt cut-off at about 1.3 hours. When discharged through a 50 ohm load, cell C, constructed in accordance with the present invention reached the 2.5 volt cut-off point after about 0.71 hours, an approximate 92% improvement over cell D which reached the cut-off point after only 0.37 hours.

The ability of the electrolyte in cells according to the present invention to keep both the anode and catalytic cathode surfaces free of alkali halide passivating films also results in cells which are capable of discharging at high rates as shown by the data depicted in FIG. 2. The rates of electrical discharge are not limited by requirement that reactants and products of the reactions at each electrode migrate through any film of passivating product formed on the electrode surfaces. Discharge rates for the cells are believed to be limited only by diffusion processes within the electrolyte itself.

FIG. 2 shows the power density of cells according to the present invention at several current density values compared to cells of similar design but employing a neutral salt electrolyte solute. The curves shown illustrate the improved discharge rates achievable with cells constructed in accordance with the present invention. The power developed by each cell, normalized by dividing by the volume of cathode material, is plotted on a logarithmic scale in FIG. 2 against the average current density discharge rate for the cells expressed logarithmically in $mA/cm^2$ of anode surface. The curves in FIG. 2 show that, particularly at higher average current density discharge rates, cells according to the present invention have much improved power output per unit of cathode volume.

A high rate discharge electrochemical cell constructed in accordance with the present invention and operable as a reserve-activated cell is shown schematically in cross-section in FIG. 3. The cell container 28 is divided into two chambers 46 and 50 by a divider 48. The lower chamber 46 contains the electrolyte 42 comprising an electrochemically reducible covalent inorganic oxyhalide or thiohalide solvent containing up to 7 moles/liter of a Lewis acid solute as the sole solute added to the electrolyte prior to discharge.

The upper chamber 50 contains the active oxidizable anode 30 in electrical contact with the cell container 28. An inert cathode current collector 34 is separated from the anode by a porous glass fiber separator 32. In one embodiment, the cathode current collector comprises carbon, containing about 2%-3% of a sinterable binder such as polytetrafluoroethylene, pressed onto one side of a thin nickel foil. A laminated sandwich comprising the anode 30 the glass separator 32, and the carbon current collector 34 is rolled into a concentric, spirally wound "jelly roll" configuration as disclosed in U.S. Pat. No. 3,510,353 to Edwin J. McHenry.

The cathode current collector, separator, and anode roll is disposed concentrically about a central tube 36 which contains a breakable seal 38 and a weighted ball 40. The lower end of the tube 36 is constricted so as to restrain the ball 40 between the end of the tube 36 and the breakable seal 38, with a small space to allow for movement of the ball 40 along the axial direction of the tube 36.

An electrical connector 20 is sealed into the cap 24 of the cell by means of a glass-to-metal seal 22. Electrical connector 20 makes contact within the cell with the cathode current collector 34. The chamber 46 is filled with electrolyte solution 42 through a resealable filling hole and cap 44.

The cell is activated by inverting the cell and sharply rapping it to cause the ball 40 to break the seal 38. The cell is held in an inverted position for a period sufficient to allow the electrolyte 42 to flow from the first chamber 46 into the second chamber 50. When the cell is returned to an upright position, the tube 36 prevents the electrolyte from leaving the second chamber 50. Alternatively, the electrolyte solution 42 can be contained under slight positive pressure in chamber 46.

The electrochemical cell illustrated in FIG. 3 is merely exemplary of cells according to the present invention and should not be viewed as limiting the scope of the invention as defined by the appended claims.

While there has been shown what is at present considered the preferred embodiments of the invention, it will be obvious to those skilled in the art that various changes and modifications may be made therein without departing from the scope of the invention as defined by the following claims.

What is claimed is:

1. A reserve-activated primary electrochemical cell comprising:
    an electrolytic solution consisting essentially of a liquid electrochemically reducible covalent inorganic oxyhalide solvent and a Lewis acid solute dissolved therein, said Lewis acid solute being the sole additive solute in said solvent;
    an oxidizable active anode;
    a solid non-consumable electrically conducting inert cathode current collector; the material of said anode being more electropositive than said cathode current collector and thus said anode is capable of being oxidized during discharge of said cell;
    a first chamber within said cell containing all of said electrolytic solution within the cell; a second chamber within said cell containing said anode and said cathode current collector; and
    valve means disposed between said first chamber and said second chamber, said valve means having a first closed condition for maintaining the contents of said first chamber and said second chamber separate whereby said cell is maintained in an inactive state, said valve means being convertible to a second open condition to permit the contents of said first chamber to enter said second chamber whereby said electrolytic solution contacts said anode and said cathode current collector thus activating the cell.

2. The cell of claim 1 wherein said oxyhalide solvent contains at least one oxyhalide of sulfur, phosphorus, or selenium.

3. The cell of claim 2 wherein said oxyhalide solvent is thionyl chloride.

4. The cell of claim 2 wherein said solute is aluminum chloride.

5. The cell of claim 1 wherein said solute is a Lewis acid selected from the group consisting of boron trichloride ($BCl_3$), aluminum chloride ($AlCl_3$), titanium chloride ($TiCl_4$), zirconium chloride ($ZrCl_4$), tin chloride ($SnCl_4$), phosphorus chloride ($PCl_5$), arsenic chloride ($AsCl_5$), antimony chloride ($SbCl_5$), zinc chloride ($ZnCl_2$), aluminum bromide ($AlBr_3$), and arsenic fluoride ($AsF_5$).

6. The cell of claim 5 wherein said anode material is lithium.

7. The cell of claim 1 wherein said oxidizable active anode comprises an alkali metal.

* * * * *

UNITED STATES PATENT OFFICE
CERTIFICATE OF CORRECTION

Patent No. 4,150,198          Dated April 17, 1979

Inventor(s) Michael J. Domeniconi and Francis G. Murphy

It is certified that error appears in the above-identified patent and that said Letters Patent are hereby corrected as shown below:

Column 3, line 6, delete the equation

"$SOCl_2 \rightleftharpoons SOCl^{30} + Cl^- \rightleftharpoons SO^{++} + 2Cl^-$"

and insert the following equation

--$SOCl_2 \rightleftharpoons SOCl^+ + Cl^- \rightleftharpoons SO^{++} + 2Cl^-$--.

Column 3, line 31, delete the equation

"$SOCl_2 + MCl_x SOCl^+ + MCl_{(x+1)}^-$"

and insert the following equation

--$SOCl_2 + MCl_x \rightleftharpoons SOCl^+ + MCl_{(x+1)}^-$--

*Signed and Sealed this*

*Twenty-fifth* Day of *March 1980*

[SEAL]

*Attest:*

SIDNEY A. DIAMOND

*Attesting Officer*      *Commissioner of Patents and Trademarks*